United States Patent
Saito et al.

(10) Patent No.: US 12,449,642 B2
(45) Date of Patent: Oct. 21, 2025

(54) CONVERTER LENS, INTERCHANGEABLE LENS, AND IMAGE CAPTURING APPARATUS

(71) Applicant: CANON KABUSHIKI KAISHA, Tokyo (JP)

(72) Inventors: Shinichiro Saito, Utsunomiya (JP); Hiroki Ebe, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 394 days.

(21) Appl. No.: 18/048,216

(22) Filed: Oct. 20, 2022

(65) Prior Publication Data
US 2023/0110115 A1 Apr. 13, 2023

Related U.S. Application Data

(63) Continuation of application No. 16/796,740, filed on Feb. 20, 2020, now Pat. No. 11,586,022.

(30) Foreign Application Priority Data

Feb. 27, 2019 (JP) .................. 2019-034284

(51) Int. Cl.
*G02B 13/18* (2006.01)
*G02B 7/02* (2021.01)
(Continued)

(52) U.S. Cl.
CPC ............ *G02B 13/18* (2013.01); *G02B 15/20* (2013.01); *G02B 7/021* (2013.01); *G02B 15/10* (2013.01);
(Continued)

(58) Field of Classification Search
CPC ........ G02B 13/18; G02B 15/20; G02B 7/021; G02B 15/10; G02B 15/12; G02B 27/0025;
(Continued)

(56) References Cited

U.S. PATENT DOCUMENTS

2011/0080647 A1* 4/2011 Sugita ............... G02B 27/0062
359/675
2011/0299179 A1 12/2011 Maetaki
(Continued)

FOREIGN PATENT DOCUMENTS

CN 101266331 A 9/2007
CN 101133934 A 3/2008
(Continued)

OTHER PUBLICATIONS

English_translation of WO2017134928, Nov. 29, 2018, (for cited by IDS).*

*Primary Examiner* — Thomas K Pham
*Assistant Examiner* — Kuei-Jen L Edenfield
(74) *Attorney, Agent, or Firm* — Canon U.S.A., Inc. IP Division

(57) ABSTRACT

A converter lens has negative refractive power, and is disposed on an image side of a master lens so that a focal length of an entire system becomes greater than a focal length of the master lens alone. The converter lens includes a first lens element closest to an object and a second lens element next to an image side of the first lens element with a space between the first lens element and the second lens element. A focal length of the converter lens, a focal length of an air lens formed by the first lens element and the second lens element, the shape of an image-side lens surface of the first lens element, and the shape of an object-side lens surface of the second lens element are determined as appropriate.

23 Claims, 15 Drawing Sheets

(51) Int. Cl.
  *G02B 15/10*   (2006.01)
  *G02B 15/12*   (2006.01)
  *G02B 15/20*   (2006.01)
  *G02B 27/00*   (2006.01)
  *G03B 17/14*   (2021.01)
  *G03B 17/58*   (2021.01)

(52) U.S. Cl.
  CPC .......... *G02B 15/12* (2013.01); *G02B 27/0025* (2013.01); *G03B 17/14* (2013.01); *G03B 17/58* (2013.01)

(58) Field of Classification Search
  CPC .......... G02B 7/023; G02B 7/02; G02B 27/00; G02B 13/005; G02B 13/16; G02B 7/14; G02B 9/12; G02B 27/0018; G02B 13/006; G02B 25/00; G02B 25/001; G03B 17/14; G03B 17/58; H04N 23/55
  USPC .......... 359/642–651, 745–756, 664
  See application file for complete search history.

(56) References Cited

U.S. PATENT DOCUMENTS

| | | |
|---|---|---|
| 2013/0308034 A1 | 11/2013 | Ogata |
| 2015/0205188 A1 | 7/2015 | Ogata |
| 2015/0226943 A1* | 8/2015 | Ogata .................. G02B 15/12 |
| | | 359/675 |
| 2016/0223799 A1 | 8/2016 | Yoneyama |
| 2016/0274443 A1* | 9/2016 | Ogata .................. G02B 15/10 |
| 2017/0003481 A1 | 1/2017 | Yamasaki |
| 2017/0090163 A1* | 3/2017 | Ori ..................... G02B 27/0025 |

FOREIGN PATENT DOCUMENTS

| | | |
|---|---|---|
| JP | 63-200113 A | 8/1988 |
| JP | 9-33805 A | 2/1997 |
| JP | 2013-235217 A | 11/2013 |
| WO | 17/134928 A1 | 8/2017 |

* cited by examiner

CONVERTER LENS, INTERCHANGEABLE LENS, AND IMAGE CAPTURING APPARATUS

CROSS-REFERENCE TO RELATED APPLICATION

This application is a Continuation of U.S. application Ser. No. 16/796,740, filed—Feb. 20, 2020; which claims priority from Japanese Patent Application No. 2019-034284, filed Feb. 27, 2019, which is hereby incorporated by reference herein in its entirety.

BACKGROUND OF THE INVENTION

Field of the Invention

The aspect of the embodiments relates to a converter lens, an interchangeable lens, and an image capturing apparatus.

Description of the Related Art

Rear converter lenses are known that are attached between an image capturing apparatus and an interchangeable lens including a master lens so that the focal length of the entire system increases.

A rear converter lens is beneficial in that the size of an entire lens system is smaller than the size in a case where a converter lens is disposed on an object side of a master lens. However, residual aberrations of the master lens increase proportionally to an enlarging magnification, so that image quality can easily deteriorate. Thus, aberrations of the rear converter lens are to be suitably corrected in order to successfully maintain aberrations of the entire system even in a case where the rear converter lens is disposed on the image side of the master lens.

WO 17/134928 discusses a rear converter lens that can be used together with a master lens having a relatively short back focus.

A rear converter lens that increases the focal length of an entire system has negative refractive power. In other words, a rear converter lens tends to have a Petzval sum with a large negative component. Thus, field curvatures are especially likely to increase, when a rear converter lens is disposed by an image side of a master lens. In many cases, no aperture diaphragm is disposed in a rear converter lens, and an aperture diaphragm of a master lens is used instead. Thus, a principal ray of off-axis light rays passes through a position apart from an optical axis in a radial direction without intersecting with the optical axis in the rear converter lens. This is another cause of an increase in field curvatures.

Furthermore, especially in a case where a master lens has a short back focus, a rear converter lens disposed on an image side of the master lens is likely to have a large lens diameter, and also getting a space for displacing a large number of lenses can easily become difficult. Thus, it is difficult to reduce a size of a converter lens while correcting field curvatures and magnification chromatic aberrations. Although the size of the converter lens can be reduced using an aspherical lens as discussed in WO 17/134928, a further improvement on magnification chromatic aberrations may be required.

SUMMARY OF THE INVENTION

According to an aspect of the embodiments, a converter lens having negative refractive power and disposed on an image side of a master lens so that a focal length of an entire system becomes greater than a focal length of the master lens alone includes a first lens element closest to an object in the converter lens and a second lens element next to an image side of the first lens element with a space between the first lens element and the second lens element, wherein the following inequalities (i.e., conditional expressions) are satisfied, $1.45<|fa/f|<8.55$, $-80.0<(ra2+ra1)/(ra2-ra1)<-2.00$, and $30.0<vAN<39.0$, where f is a focal length of the converter lens, na1 is a d-line refractive index of a material of an image-side lens surface of the first lens element, na2 is a d-line refractive index of a material of an object-side lens surface of the second lens element, ra1 is a curvature radius of the image-side lens surface of the first lens element, ra2 is a curvature radius of the object-side lens surface of the second lens element, fa is a focal length of the space between the first lens element and the second lens element and is defined as $fa=1/[\{(1/ra1)\times(1-na1)/na2\}-\{(1/ra2)\times(1-na2)/na2\}]$, and vAN is an average Abbe number of a material of every negative lens included in the converter lens using a d-line as a reference.

According to another aspect of the embodiments, an interchangeable lens includes a master lens and a converter lens having negative refractive power and disposed on an optical path of the master lens so that a focal length of an entire system becomes greater than a focal length of the master lens alone, the converter lens including a first lens element closest to an object in the converter lens, and a second lens element next to an image side of the first lens element with a space between the first lens element and the second lens element, wherein the following inequalities are satisfied, $1.45<|fa/f|<8.55$, $-80.0<(ra2+ra1)/(ra2-ra1)<-2.00$, and $30.0<vAN<39.0$, where f is a focal length of the converter lens, na1 is a d-line refractive index of a material of an image-side lens surface of the first lens element, na2 is a d-line refractive index of a material of an object-side lens surface of the second lens element, ra1 is a curvature radius of the image-side lens surface of the first lens element, ra2 is a curvature radius of the object-side lens surface of the second lens element, fa is a focal length of the space between the first lens element and the second lens element and is defined as $fa=1/[\{(1/ra1)\times(1-na1)/na2\}-\{(1/ra2)\times(1-na2)/na2\}]$, and vAN is an average Abbe number of a material of every negative lens included in the converter lens using a d-line as a reference.

According to yet another aspect of the embodiments, an image capturing apparatus includes a master lens, a converter lens having negative refractive power and disposed on an optical path of the master lens so that a focal length of an entire system becomes greater than a focal length of the master lens alone, and an image sensor, the converter lens including a first lens element closest to an object in the converter lens and a second lens element next to an image side of the first lens element with a space between the first lens element and the second lens element, wherein the following inequalities are satisfied, $1.45<|fa/f|<8.55$, $-80.0<(ra2+ra1)/(ra2-ra1)<-2.00$, and $30.0<vAN<39.0$, where f is a focal length of the converter lens, na1 is a d-line refractive index of a material of an image-side lens surface of the first lens element, na2 is a d-line refractive index of a material of an object-side lens surface of the second lens element, ra1 is a curvature radius of the image-side lens surface of the first lens element, ra2 is a curvature radius of the object-side lens surface of the second lens element, fa is a focal length of the space between the first lens element and the second lens element and is defined as $fa=1/[\{(1/ra1)\times(1-na1)/na2\}-\{(1/ra2)\times(1-na2)/na2\}]$, and vAN is an average Abbe number of a material of every negative lens included in the converter lens using a d-line as a reference.

Further features of the disclosure will become apparent from the following description of exemplary embodiments with reference to the attached drawings.

DESCRIPTION OF THE EMBODIMENTS

A rear converter lens (hereinafter, referred to as "converter lens") and an image capturing apparatus according to each exemplary embodiment of the disclosure will be described below with reference to the attached drawings.

Figure 1:
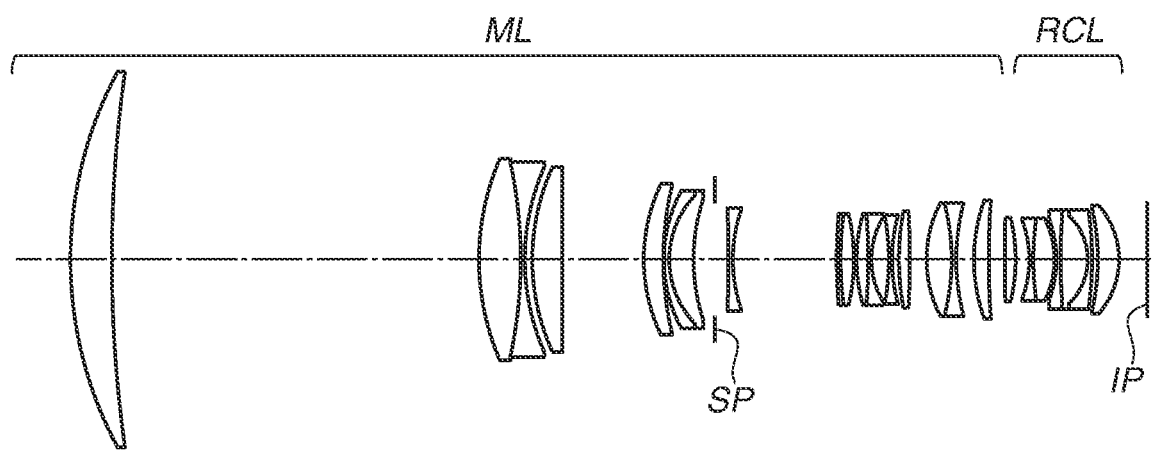
FIG. 1 illustrates a cross-sectional view of a master lens and a converter lens.

As illustrated in FIG. 1, a converter lens RCL according to an exemplary embodiment of the disclosure is disposed on an image side of a master lens ML (main lens system), such as an interchangeable lens, so that a focal length of an image capturing optical system (entire system), which includes the master lens ML and the converter lens RCL, becomes longer than a focal length of an image capturing optical system including the master lens ML.

The master lens ML is an image capturing lens system used in an image capturing apparatus, such as a digital video camera, a digital camera, a silver-halide film camera, and a television (TV) camera.

In cross-sectional views of the master lens ML illustrated in FIG. 1 and the converter lens RCL illustrated in FIGS. 3, 5, 7, 9, 11, and 13, the left-hand side is an object side (e.g., front), and the right-hand side is the image side (e.g., rear). An aperture diaphragm SP determines (limits) a light flux of a full aperture f-number (Fno).

In a case where the image capturing apparatus is a digital video camera or a digital camera, an image plane IP corresponds to an image capturing surface of an image sensor (e.g., photoelectric conversion element), such as a charge-coupled device (CCD) sensor or a complementary metal oxide semiconductor (CMOS) sensor. In a case where the image capturing apparatus is a silver-halide film camera, the image plane IP corresponds to a film surface.

Figure 2:
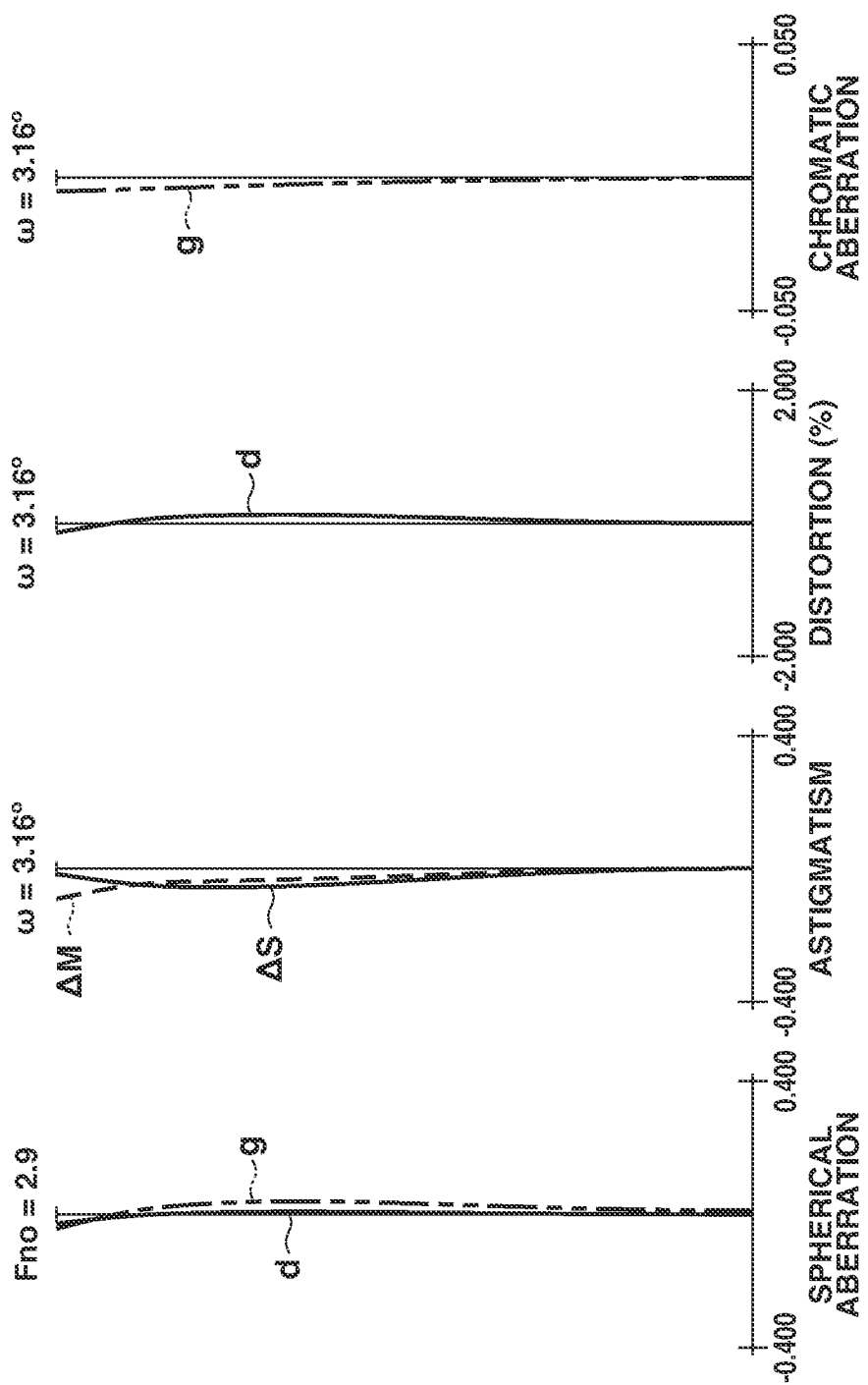
FIG. 2 is an aberration diagram illustrating the master lens of when an infinitely-distant object is in focus.

FIG. 2 is an aberration diagram illustrating the master lens ML. FIGS. 4, 6, 8, 10, 12, and 14 are aberration diagrams illustrating the converter lenses RCL according to respective exemplary embodiments described below. In each spherical aberration diagram, a solid line denotes a d-line, and a dashed-and-double-dotted line denotes a g-line. In each astigmatism diagram, a broken line ΔM denotes an aberration amount on a meridional image plane, and a solid line ΔS denotes an aberration amount on a sagittal image plane. Each distortion aberration illustrates a d-line. Each magnification chromatic aberration illustrates a g-line. Further, ω denotes a half angle of view (in degrees), and is an angle of view obtained by paraxial calculation. Fno denotes the f-number.

The converter lens RCL according to each exemplary embodiment having negative refractive power is disposed on the image side of the master lens ML so that the focal length of the entire system becomes greater than the focal length of the master lens ML alone.

Further, the converter lens RCL includes a first lens element L1 and a second lens element L2. The first lens element L1 is disposed closest to an object in the converter lens RCL. The second lens element L2 is disposed next to an image side of the first lens element L1 with a space between the first lens element L1 and the second lens element L2. As used herein, the term "lens element" refers to a lens element that includes a single lens or a cemented lens having a plurality of lenses. In the present specification, the space between the first lens element L1 and the second lens element L2 is also referred to as an "air lens". Specifically, the air lens between the first lens element L1 and the second lens element L2 is also an air lens closest to the object in the converter lens RCL. Even in a case where the first lens element L1 and the second lens element L2 are partially cemented, the space is referred to as the air lens, if there is a space along an optical axis between the first lens element L1 and the second lens element L2.

Further, a focal length fa of the air lens is expressed as:

$$fa = 1/[\{(1/ra1) \times (1-na1)/na2\} - \{(1/ra2) \times (1-na2)/na2\}],$$

where na1 is a d-line refractive index of an image-side lens surface material of the first lens element L1, na2 is a d-line refractive index of an object-side lens surface material of the second lens element L2, ra1 is a curvature radius of the image-side lens surface of the first lens element L1, and ra2 is a curvature radius of the object-side lens surface of the second lens element L2.

In a case where the first lens element L1 includes a cemented lens, na1 is a d-line refractive index of a material of a lens closest to the image in the first lens element L1. Further, in a case where the second lens element L2 includes a cemented lens, na2 is a d-line refractive index of a lens closest to the object in the second lens element L2.

In a case where a lens surface is aspherical, a curvature radius is a base curvature radius (paraxial curvature radius).

In the case where a lens surface is aspherical, an aspherical shape is expressed as, for example, $$x=(h^2/R)/[1+\{1-(1+k)(h/R)^2\}^{1/2}]A4h^4+A6h^6+A8h^8+A10h^{10}+A12h^{12},$$

where k is an eccentricity, A4, A6, A8, A10, and A12 are aspherical coefficients, x is a displacement at a height h from the optical axis in an optical axis direction based on a vertex of the lens surface, and R is a paraxial curvature radius. A curvature radius component of the expression is given as $(h^2/R)/[1+\{1-(1+k)(h/R)^2\}^{1/2}]$. The focal length fa of the air lens is calculated as $r'=[R-\{R^2-(1+k)R^2\}^{1/2}]/(1+k)$. The height h from the optical axis is calculated using a maximum image height h of the master lens ML or the converter lens RCL as a representative value of the converter lens RCL.

In a case where k>0, the calculation is conducted using k=0.

At this time, the following inequalities (1) and (2) are satisfied:

$$1.45<|fa/f|<8.55, \tag{1}$$

$$-80.0<(ra2+ra1)/(ra2-ra1)-2.00, \tag{2}$$

where f is the focal length of the converter lens RCL, and the focal length fa and the curvature radii ra1 and ra2 are as described above.

The refractive power and shape of the air lens closest to the object are important elements for successfully correcting image plane characteristics and increasing the degree of freedom in selecting a material of a lens next to the air lens to reduce a Petzval sum.

The inequality (1) defines a desirable range of the refractive power of the air lens closest to the object in the converter lens RCL using the focal length of the air lens with respect to the focal length of the converter lens RCL.

If a value of the inequality (1) exceeds the upper limit value thereof, and the focal length of the air lens increases (i.e., the absolute value of the focal length increases) and the refractive power of the air lens decreases, it becomes difficult to correct off-axis coma aberrations in the first lens element L1 and the second lens element L2. Thus, exceeding the upper limit value of the inequality (1) is undesirable. If a value of the inequality (1) falls below the lower limit value thereof, and the focal length of the air lens decreases (i.e., the absolute value of the focal length decreases) and the refractive power of the air lens increases, fluctuations in field curvatures with respect to each wavelength occur. Thus, falling below the lower limit value of the inequality (1) is undesirable.

The inequality (2) defines a desirable shape factor of the air lens. If the inequality (2) is satisfied, field curvatures, magnification chromatic aberrations, and distortion aberrations are successfully corrected and high optical performance can be realized.

If a value of the inequality (2) exceeds the upper limit value thereof, and the shape of the image-side lens surface of the first lens element L1 and the shape of the object-side lens surface of the second lens element L2 become similar, an aberration correction function of the air lens becomes inadequate, and it becomes difficult to successfully correct magnification chromatic aberrations and distortion aberrations. Thus, exceeding the upper limit value of the inequality (2) is undesirable. If a value of the inequality (2) falls below the lower limit value thereof and a degree of a meniscus shape of the air lens increases, field curvatures increase and fluctuations in field curvatures with respect to each wavelength increase. Thus, falling below the lower limit value of the inequality (2) is undesirable.

As described above, according to an exemplary embodiment of the disclosure, the converter lens RCL with high optical performance can be realized. The converter lens RCL can be reduced in size depending on the focal length of the converter lens RCL. The converter lens RCL according to an exemplary embodiment of the disclosure is suitable for use especially in a converter apparatus that is disposed between a mirrorless camera and an interchangeable lens that is attachable to and detachable from the mirrorless camera having a relatively short back focus.

In one embodiment, the numerical ranges of the inequalities (1) and (2) are:

$$1.47<|fa/f|<8.52, \tag{1a}$$

$$-75.0<(ra2+ra1)/(ra2-ra1)<-3.00. \tag{2a}$$

In another embodiment, the numerical ranges of the inequalities (1) and (2) are:

$$1.48<|fa/f|<8.50, \tag{1b}$$

$$-70.0<(ra2+ra1)/(ra2-ra1)<-4.40. \tag{2b}$$

Further, in one embodiment, the converter lens RCL satisfies one or more of the following inequalities (3) to (11):

$$1.58<nAP<1.80, \tag{3}$$

$$1.80<nAN<2.20, \tag{4}$$

$$0.01<|f1/fa|<0.40, \tag{5}$$

$$0.15<|f1/f|<0.70, \tag{6}$$

$$30.0<vAN<39.0, \tag{7}$$

$$0.02<rl/f<0.32, \tag{8}$$

$$1.75<nd1<2.00, \tag{9}$$

$$0.04<f2/f<1.10, \tag{10}$$

$$1.00<ra2/rl<3.40. \tag{11}$$

In a case where the converter lens RCL includes at least one positive lens, nAP is an average d-line refractive index of a material of every positive lens included in the converter lens RCL. In a case where the converter lens RCL includes at least one negative lens, nAN is an average d-line refractive index of a material of every negative lens included in the converter lens RCL.

Further, f1 is the focal length of the first lens element L1, and f2 is the focal length of the second lens element L2.

In a case where the converter lens RCL includes at least one negative lens, vAN is an average Abbe number of a material of every negative lens included in the converter lens RCL using the d-line as a reference. The Abbe number vi of a material is expressed by the following expression:

$$vi=(Nd-1)/(NF-NC),$$

where Nd, NF, and NC are the refraction indexes of the Fraunhofer d-line (587.56 nm), F-line (486.13 nm), and C-line (656.27 nm), respectively.

In a case where the lens surface closest to the image in the converter lens RCL is convex with respect to the image, r1 is the curvature radius of the lens surface.

In a case where the converter lens RCL includes at least one positive lens, nd1 is the d-line refractive index of a material of a positive lens Lp closest to the object among the positive lens(es) of the converter lens RCL.

In a case where the first lens element L1 has positive refractive power and the second lens element L2 has negative refractive power, r1 is the curvature radius of the lens surface closest to the image in the converter lens RCL.

The inequality (3) defines an average refractive index of a material of every positive lens included in the converter lens RCL. If the inequality (3) is satisfied, especially on-axis chromatic aberrations and field curvatures can be successfully corrected.

If a value of the inequality (3) exceeds the upper limit value thereof and the average refractive index increases, the absolute value of the Petzval sum increases and field curvatures increase. Thus, exceeding the upper limit value of the inequality (3) is undesirable. Furthermore, increasing the number of lenses to correct the field curvatures is undesirable because it becomes difficult to reduce the size of the converter lens RCL. If a value of the inequality (3) falls below the lower limit value, and the average refractive index decreases and the Abbe number of the material increases, it becomes difficult to correct on-axis chromatic aberrations. Thus, falling below the lower limit value of the inequality (3) is undesirable.

In general, there is a tendency that the higher the refractive index of a material of a negative lens becomes, the smaller the Abbe number becomes. Thus, if a value of the inequality (4) exceeds the upper limit value thereof and the average refractive index increases and the Abbe number decreases, first-order chromatic aberrations are not adequately corrected, and it becomes difficult to correct magnification chromatic aberrations. Thus, exceeding the upper limit value of the inequality (4) is undesirable. If a value of the inequality (4) falls below the lower limit value and the average refractive index decreases, the negative component of the Petzval sum increases and field curvatures increase. Thus, falling below the lower limit value of the inequality (4) is undesirable. Furthermore, increasing the number of lenses to correct the field curvatures is undesirable because it becomes difficult to reduce the size of the converter lens RCL.

The inequality (4) defines an average refractive index of a material of every negative lens included in the converter lens RCL. If the inequality (4) is satisfied, especially magnification chromatic aberrations and field curvatures can be successfully corrected.

The inequality (5) defines the focal length of the first lens element L1 using the focal length of the air lens. If the inequality (5) is satisfied, the size of a lens that is closer to the image than the first lens element L1 is can be reduced, or aberrations such as field curvatures can be successfully corrected.

If a value of the inequality (5) exceeds the upper limit value thereof, and the focal length of the first lens element L1 increases (i.e., the absolute value of the focal length increases) and the refractive power of the first lens element L1 decreases, an angle of a principal ray of off-axis light rays output from the first lens element L1 from the optical axis increases. Consequently, the diameter of a lens that is closer to the image than the first lens element L1 increases, and it becomes difficult to reduce the size of the converter lens RCL. Thus, exceeding the upper limit value of the inequality (5) is undesirable. Furthermore, exceeding the upper limit value of the inequality (5) is undesirable because field curvatures and magnification chromatic aberrations increase. If a value of the inequality (5) falls below the lower limit value, and the focal length of the first lens element L1 decreases (i.e., the absolute value of the focal length decreases) and the refractive power of the first lens element L1 increases, spherical aberrations increase in a negative direction. Thus, falling below the lower limit value of the inequality (5) is undesirable.

The inequality (6) defines the focal length of the first lens element L1 using the focal length of the converter lens RCL. If the inequality (6) is satisfied, the refractive power of the first lens element L1 increases and the size of the converter lens RCL is reduced while the negative refractive power of the converter lens RCL decreases and field curvatures can be successfully corrected.

If a value of the inequality (6) exceeds the upper limit value thereof, and the focal length of the first lens element L1 increases (i.e., the absolute value of the focal length increases) and the refractive power of the first lens element L1 decreases, the negative refractive power of the entire converter lens RCL becomes excessively strong. Consequently, the Petzval sum increases in the negative direction, and it becomes difficult to correct field curvatures. Thus, exceeding the upper limit value of the inequality (6) is undesirable. If a value of inequality (6) falls below the lower limit value, and the focal length of the first lens element L1 decreases (i.e., the absolute value of the focal length decreases) and the refractive power of the first lens element L1 increases, it becomes difficult to correct on-axis chromatic aberrations in the first lens element L1 using a lens that is closer to the image than the first lens element L1 is. Thus, falling below the lower limit value of inequality (6) is undesirable. Furthermore, falling below the lower limit value of inequality (6) is undesirable because the number of lenses is to increase to correct the on-axis chromatic aberrations, and it becomes difficult to reduce the size of the converter lens RCL.

The inequality (7) defines the average Abbe number of a material of every negative lens included in the converter lens RCL. In a high refractive area with a refractive index of 1.80 or more, a partial dispersion ratio tends to increase as the Abbe number decreases. To reduce a secondary spectrum of magnification chromatic aberrations, a material that is highly refractive and has relatively high dispersion characteristics (e.g., low Abbe number) is used. However, if the Abbe number is not within a desirable range as in a case where a value of the inequality (7) exceeds the upper limit value or a case where a value of the inequality (7) falls below the lower limit value, correcting first-order chromatic aberrations becomes difficult, and correcting field curvatures and magnification chromatic aberrations becomes difficult. Thus, exceeding the upper limit value or falling below the lower limit value of the inequality (7) is undesirable.

The inequality (8) defines the curvature radius r1 of a lens surface closest to the image in the converter lens RCL using the focal length of the converter lens RCL. To reduce aberrations caused by off-axis light rays incident on the image plane IP, each off-axis light ray is to enter the lens surface closest to the image in the converter lens RCL while maintaining substantially the same concentricity with respect to an exit pupil. Thus, in an optical system in which the position of the exit pupil is close to the image plane IP, it is important to arrange a lens surface that is convex with respect to the image as a lens surface closest to the image and to set the curvature radius of the lens surface as appropriate.

If a value of the inequality (8) exceeds the upper limit value and the absolute value of the curvature radius of the lens surface closest to the image in the converter lens RCL becomes greater (i.e., curvature becomes smaller) than the negative refractive power of the converter lens RCL, field curvatures and distortion aberrations are not adequately corrected. Thus, exceeding the upper limit value of the inequality (8) is undesirable. If a value of the inequality (8) falls below the lower limit value, and the absolute value of the curvature radius of the lens surface closest to the image in the converter lens RCL becomes smaller (i.e., curvature becomes greater) than the negative refractive power of the converter lens RCL and a semi-angular aperture of the lens surface increases, conducting processing such as polishing and coating becomes difficult. Thus, falling below the lower limit value of the inequality (8) is undesirable.

The inequality (9) defines the refractive index of a material of the positive lens Lp closest to the object among the positive lenses included in the converter lens RCL. If the inequality (9) is satisfied, the size of the converter lens RCL and spherical aberrations and coma aberrations can be reduced.

If a value of the inequality (9) exceeds the upper limit value and the refractive index of the material of the positive lens Lp increases, the difference between the refractive power of the positive lens Lp with respect to on-axis light rays and the refractive power of the positive lens Lp with respect to off-axis light rays decreases, and field curvatures and magnification chromatic aberrations are not adequately corrected. Thus, exceeding the upper limit value of the inequality (9) is undesirable. If a value of the inequality (9) falls below the lower limit value and the refractive index of the material of the positive lens Lp decreases, significant high-order spherical aberrations and coma aberrations occur, and correcting the high-order spherical aberrations and coma aberrations become difficult. Thus, falling below the lower limit value of the inequality (9) is undesirable.

The inequality (10) defines the focal length of the second lens element L2 using the focal length of the converter lens RCL. The first lens element L1 having positive refractive power refracts off-axis light rays such that the angle of a principal ray of the off-axis light rays becomes close to a direction parallel to the optical axis, and the second lens element L2 having strong negative refractive power is disposed on an image side of the first lens element L1, whereby field curvatures are successfully corrected.

If a value of the inequality (10) exceeds the upper limit value, and the focal length of the second lens element L2 increases (i.e., the absolute value of the focal length increases) and the refractive power of the second lens element L2 decreases, successfully correcting off-axis coma aberrations becomes difficult. Thus, exceeding the upper limit value of the inequality (10) is undesirable. If a value of the inequality (10) falls below the lower limit value, and the focal length of the second lens element L2 decreases (i.e., the absolute value of the focal length decreases) and the refractive power of the second lens element L2 increases and the angle of the principal ray of the off-axis light rays output from the second lens element L2 with respect to the optical axis increases, the diameter of the lens closer to the image than the second lens element L2 increases, and reducing the size of the converter lens RCL becomes difficult. Thus, falling below the lower limit value of the inequality (10) is undesirable.

The inequality (11) defines the curvature radius of the object-side lens surface of the second lens element L2 using the curvature radius of the lens surface closest to the image in the converter lens RCL. The inequality (11) indicates that the lens surface closest to the image in the converter lens RCL and the object-side lens surface of the second lens element L2 are both convex with respect to the same direction. If the inequality (11) is satisfied, off-axis light rays output from the first lens element L1 enter the image plane IP at an appropriate angle, and thus field curvatures, distortion aberrations, and magnification chromatic aberrations are successfully corrected.

If a value of the inequality (11) exceeds the upper limit value, and the absolute value of the curvature radius of the object-side lens surface of the second lens element L2 increases (i.e., curvature decreases), correcting aberrations such as field curvatures and distortion aberrations becomes difficult. Thus, exceeding the upper limit value of the inequality (11) is undesirable. If a value of the inequality (11) falls below the lower limit value and the absolute value of the curvature radius of the object-side lens surface of the second lens element L2 decreases (i.e., curvature increases), aberrations such as field curvatures and distortion aberrations are excessively corrected. Thus, falling below the lower limit value of the inequality (11) is undesirable.

In one embodiment, the numerical ranges of the inequalities (3) to (11) are:

$$1.60 < nAP < 1.75, \quad (3a)$$

$$1.84 < nAN < 2.00, \quad (4a)$$

$$0.10 < |f1/fa| < 0.35, \quad (5a)$$

$$0.02 < |f1/f| < 0.55, \quad (6a)$$

$$0.04 < r1/f < 0.28, \quad (8a)$$

$$1.78 < nd1 < 1.90, \quad (9a)$$

$$0.07 < f2/f < 0.80, \quad (10a)$$

$$1.10 < ra2/r1 < 3.00. \quad (11a)$$

In another embodiment, the numerical ranges of the inequalities (3) to (11) are:

$$1.62 < nAP < 1.73, \quad (3b)$$

$$1.86 < nAN < 1.95, \quad (4b)$$

$$0.03 < |f1/fa| < 0.31, \quad (5b)$$

$$0.27 < |f1/f| < 0.53, \quad (6b)$$

$$0.06 < r1/f < 0.24, \quad (8b)$$

$$1.80 < nd1 < 1.86, \quad (9b)$$

$$0.10 < f2/f < 0.60, \quad (10b)$$

$$1.30 < ra2/r1 < 2.80. \quad (11b)$$

If at least one of the above inequalities is satisfied, high optical performance can be realized by successfully correcting aberrations such as field curvatures and magnification chromatic aberrations. Furthermore, the converter lens RCL can be reduced in size.

Next, a configuration of the converter lens RCL will be described.

As described in first and third to sixth exemplary embodiments below, the second lens element L2 includes a cemented lens including a negative lens, a positive lens, and a negative lens cemented together and arranged in this order from the object side to the image side. This brings the Petzval sum close to zero and successfully corrects field curvatures.

In one embodiment, the lens surface closest to the object in the second lens element L2 is concave with respect to the object. Furthermore, the lens surface closest to the image in the second lens element L2 is concave with respect to the image. This reduces astigmatisms.

In one embodiment, a lens element (e.g., a single cemented lens including a plurality of lenses cemented together or a single lens) closest to the image in the converter lens RCL has positive refractive power. This makes it easy to correct field curvatures.

In one embodiment, every lens of the converter lens RCL is a spherical lens. Manufacturing cost of the converter lens RCL can be low without using an aspherical lens.

Next, the master lens ML according to an exemplary embodiment and the converter lens RCL according to an exemplary embodiment will be described.

[Master Lens]

In the present specification, the configuration of the master lens ML is common to the first to sixth exemplary embodiments of the converter lens RCL.

FIG. 1 is a cross-sectional view illustrating the master lens ML of when an infinitely-distant object is in focus. FIG. 2 is an aberration diagram of the master lens ML of when an infinitely-distant object is in focus. The master lens ML has an f-number of 2.90, a half angle of view of 3.16 degrees, and a back focus of 39 mm. Each configuration of the master lens ML described in the exemplary embodiments is a mere example, and any other optical system capable of forming an image on the image plane IP can be employed.

[Converter Lens]

Next, the converter lenses RCL according to the first to sixth exemplary embodiments will be described.

Figure 3:
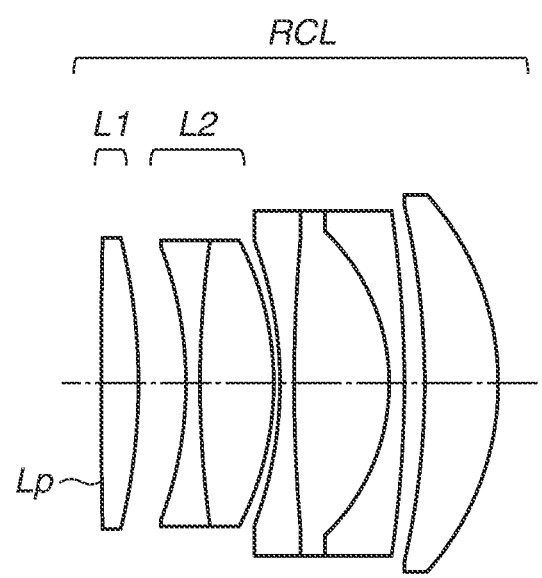
FIG. 3 illustrates a cross-sectional view of a converter lens according to a first exemplary embodiment.
Figure 4:
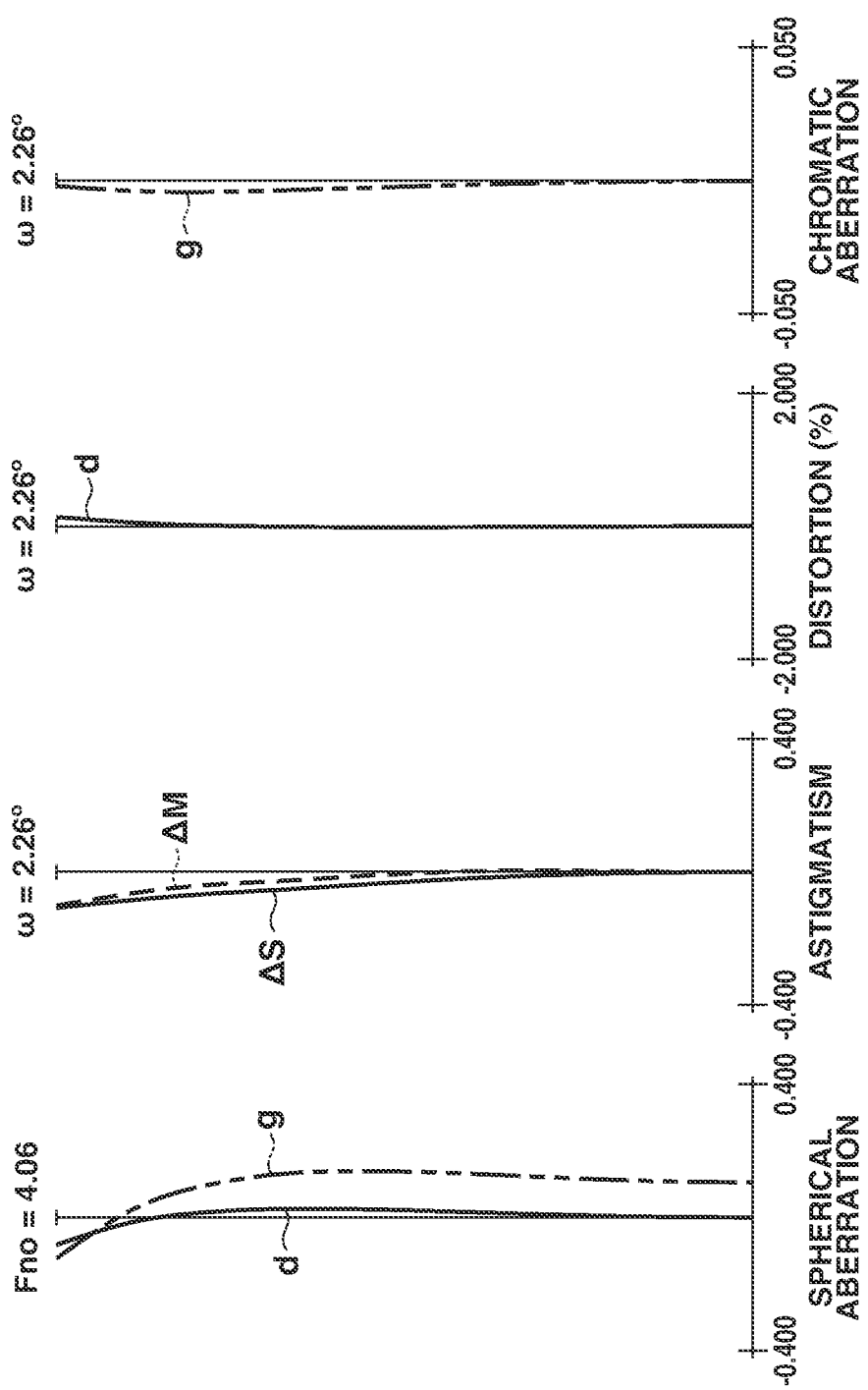
FIG. 4 illustrates an aberration diagram of when an infinitely-distant object is in focus in a case where the converter lens according to the first exemplary embodiment is disposed on an image side of the master lens.

FIG. 3 is a cross-sectional view illustrating the converter lens RCL according to the first exemplary embodiment. FIG. 4 is an aberration diagram of when an infinitely-distant object is in focus in a case where the converter lens RCL according to the first exemplary embodiment is disposed on the image side of the master lens ML.

In the converter lens RCL according to the first exemplary embodiment, the first lens element L1 is a positive lens Lp disposed closest to the object in the converter lens RCL. The second lens element L2 is a cemented lens including a negative lens and a positive lens disposed next to an image side of the negative lens. The negative lens is the second lens from the object in the converter lens RCL.

Figure 5:
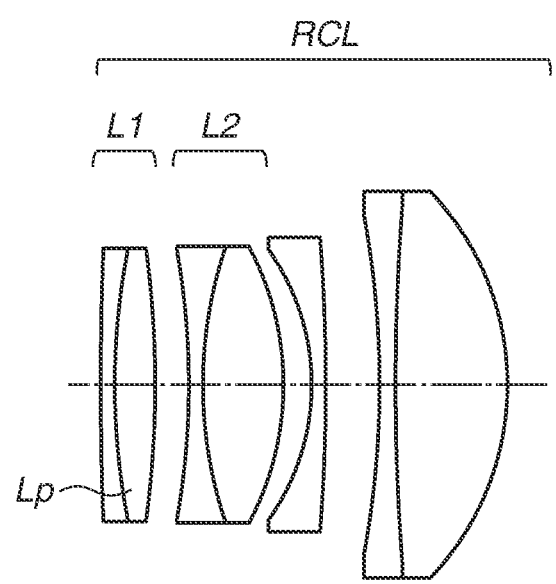
FIG. 5 illustrates a cross-sectional view of a converter lens according to a second exemplary embodiment.
Figure 6:
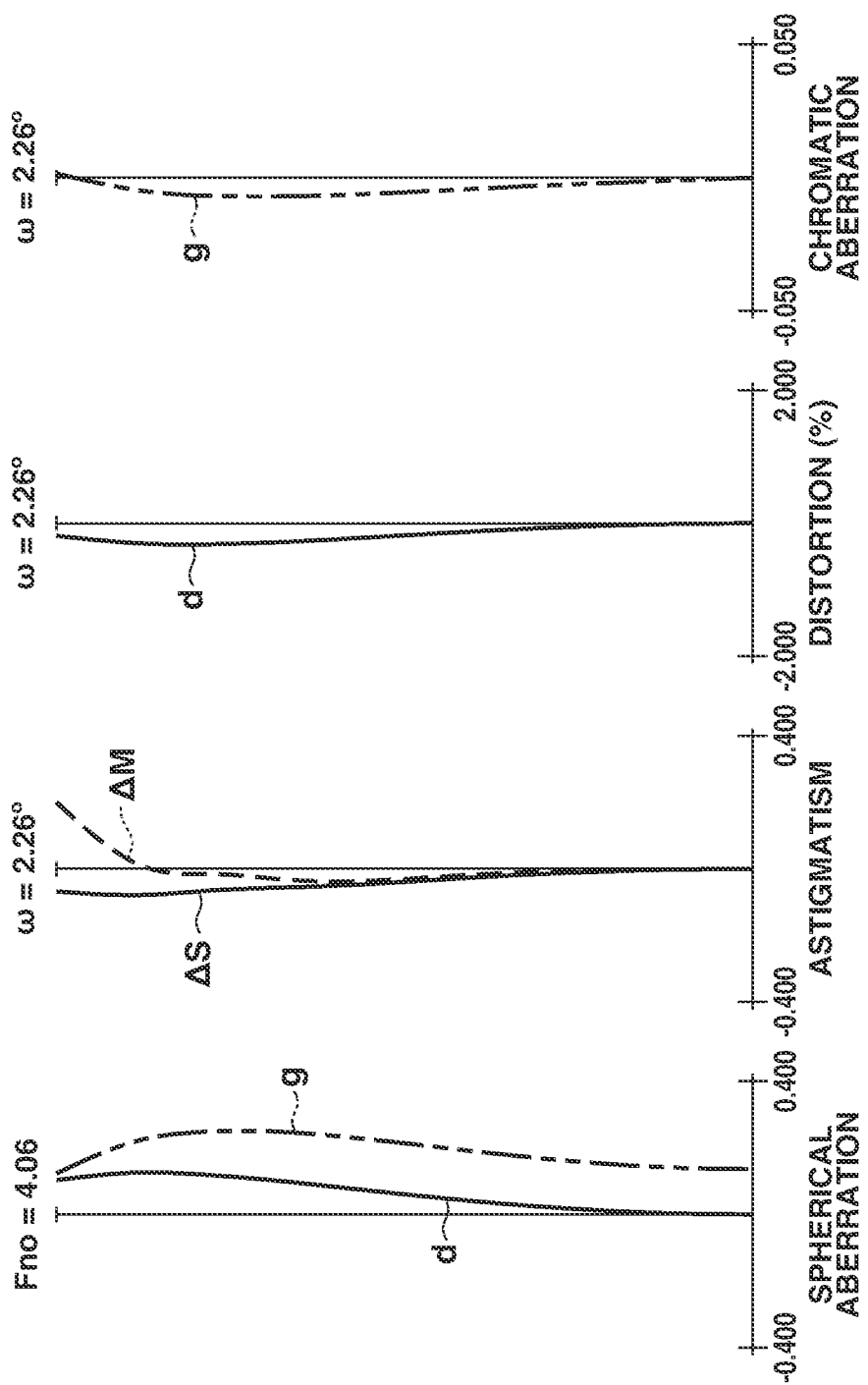
FIG. 6 illustrates an aberration diagram of when an infinitely-distant object is in focus in a case where the converter lens according to the second exemplary embodiment is disposed on an image side of the master lens.

FIG. 5 is a cross-sectional view illustrating the converter lens RCL according to the second exemplary embodiment. FIG. 6 is an aberration diagram of when an infinitely-distant object is in focus in a case where the converter lens RCL according to the second exemplary embodiment is disposed on the image side of the master lens ML.

In the converter lens RCL according to the second exemplary embodiment, the first lens element L1 is a cemented lens including a negative lens closest to the object in the converter lens RCL and a positive lens Lp disposed next to an image side of the negative lens. The second lens element L2 is a cemented lens including a negative lens and a positive lens disposed next to an image side of the negative lens. The negative lens is the third lens from the object in the converter lens RCL.

Figure 7:
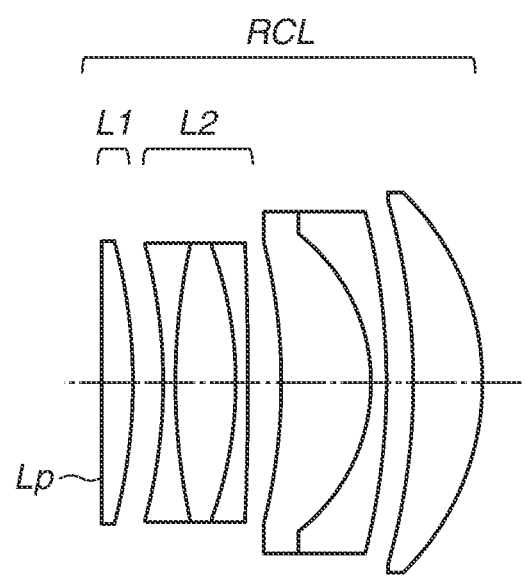
FIG. 7 illustrates a cross-sectional view of a converter lens according to a third exemplary embodiment.
Figure 8:
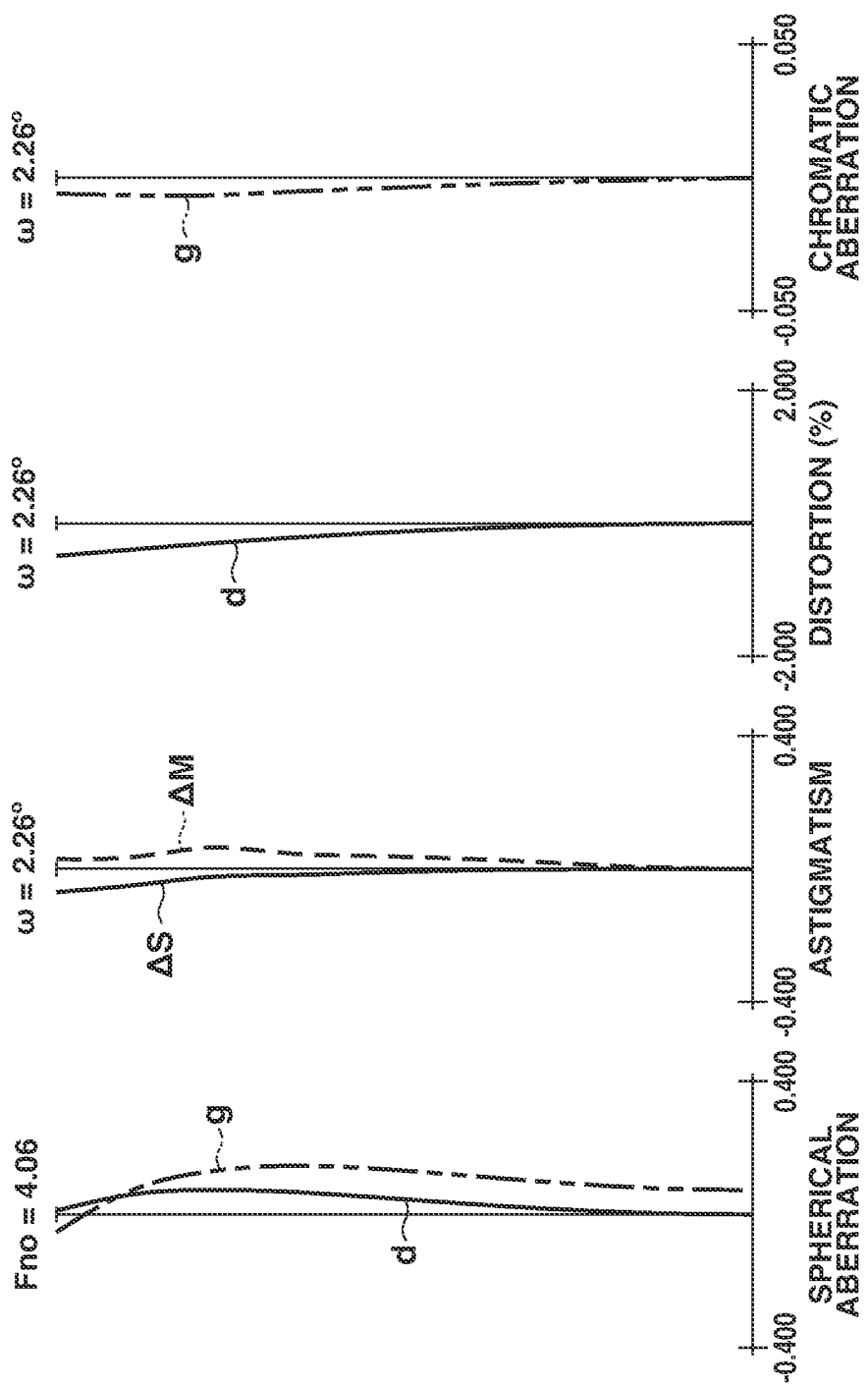
FIG. 8 illustrates an aberration diagram of when an infinitely-distant object is in focus in a case where the converter lens according to the third exemplary embodiment is disposed on an image side of the master lens.

FIG. 7 is a cross-sectional view illustrating the converter lens RCL according to the third exemplary embodiment. FIG. 8 is an aberration diagram of when an infinitely-distant object is in focus in a case where the converter lens RCL according to the third exemplary embodiment is disposed on the image side of the master lens ML.

In the converter lens RCL according to the third exemplary embodiment, the first lens element L1 is a positive lens Lp closest to the object in the converter lens RCL. The second lens element L2 is a cemented lens including three lenses: a negative, a positive, and a negative lens in this order. These lenses are disposed on a second, third, and fourth lens position from a lens closest to the object in the converter lens RCL.

Figure 9:
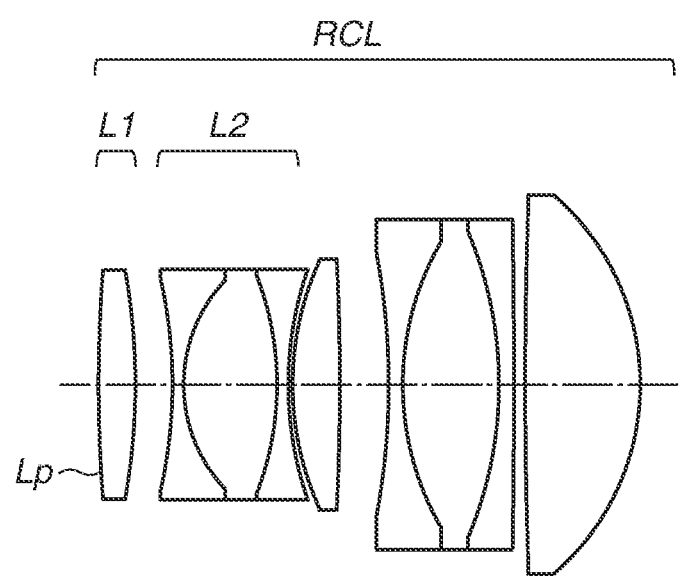
FIG. 9 illustrates a cross-sectional view illustrating a converter lens according to a fourth exemplary embodiment.
Figure 10:
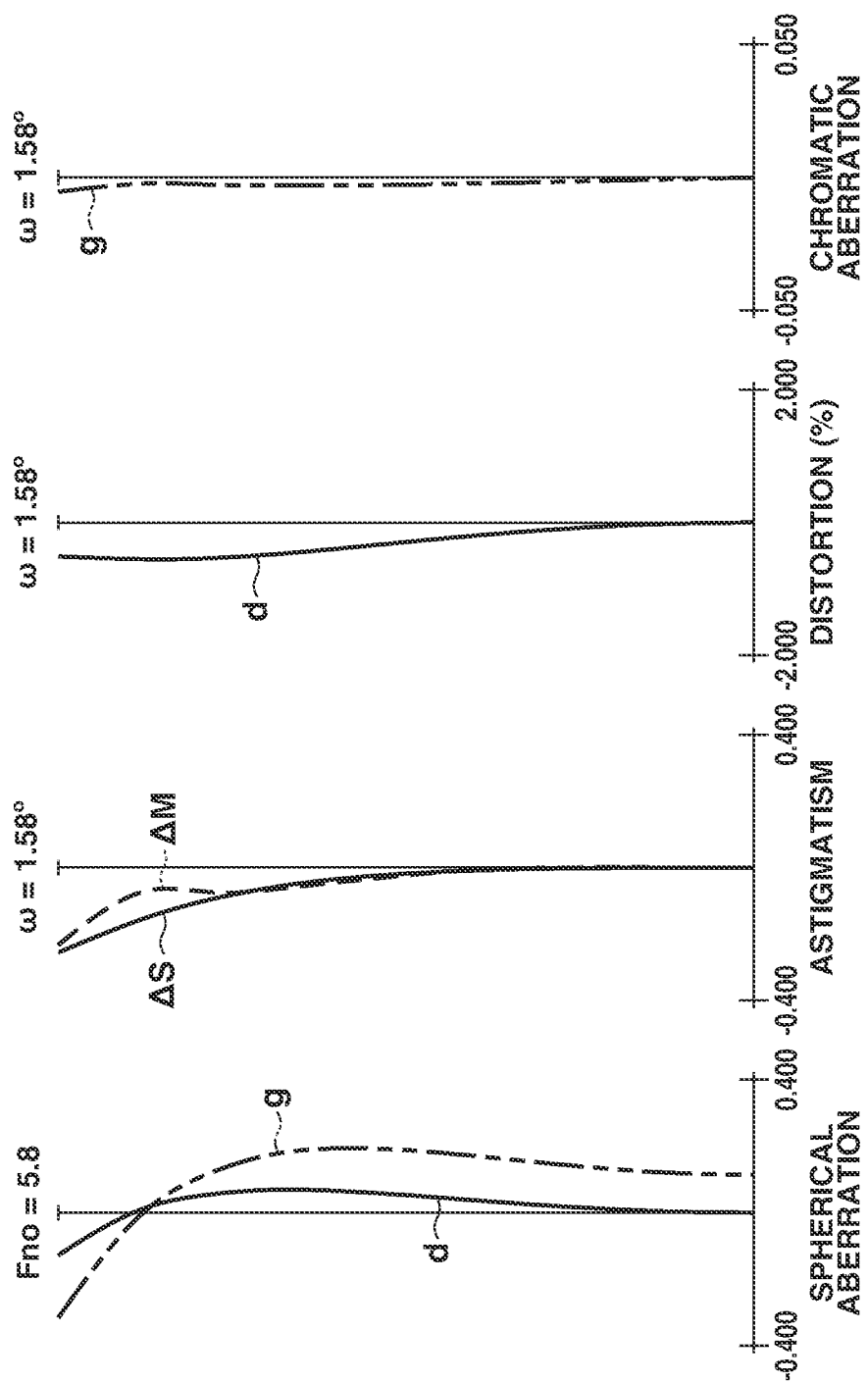
FIG. 10 illustrates an aberration diagram of when an infinitely-distant object is in focus in a case where the converter lens according to the fourth exemplary embodiment is disposed on an image side of the master lens.

FIG. 9 is a cross-sectional view illustrating the converter lens RCL according to the fourth exemplary embodiment. FIG. 10 is an aberration diagram of when an infinitely-distant object is in focus in a case where the converter lens RCL according to the fourth exemplary embodiment is disposed on the image side of the master lens ML.

In the converter lens RCL according to the fourth exemplary embodiment, the first lens element L1 is a positive lens Lp closest to the object in the converter lens RCL. The second lens element L2 is a cemented lens including three lenses: a negative, a positive, and a negative lens in this order. These lenses are disposed on a second, third, and fourth lens position from a lens closest to the object in the converter lens RCL.

Figure 11:
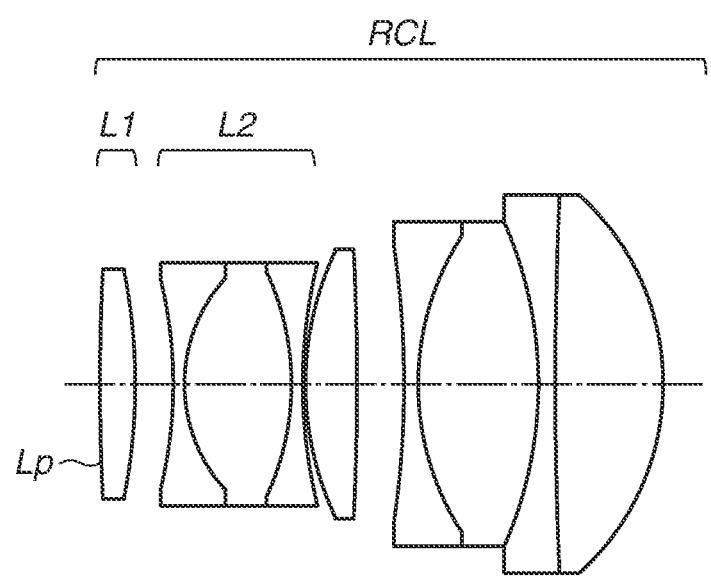
FIG. 11 illustrates a cross-sectional view illustrating a converter lens according to a fifth exemplary embodiment.
Figure 12:
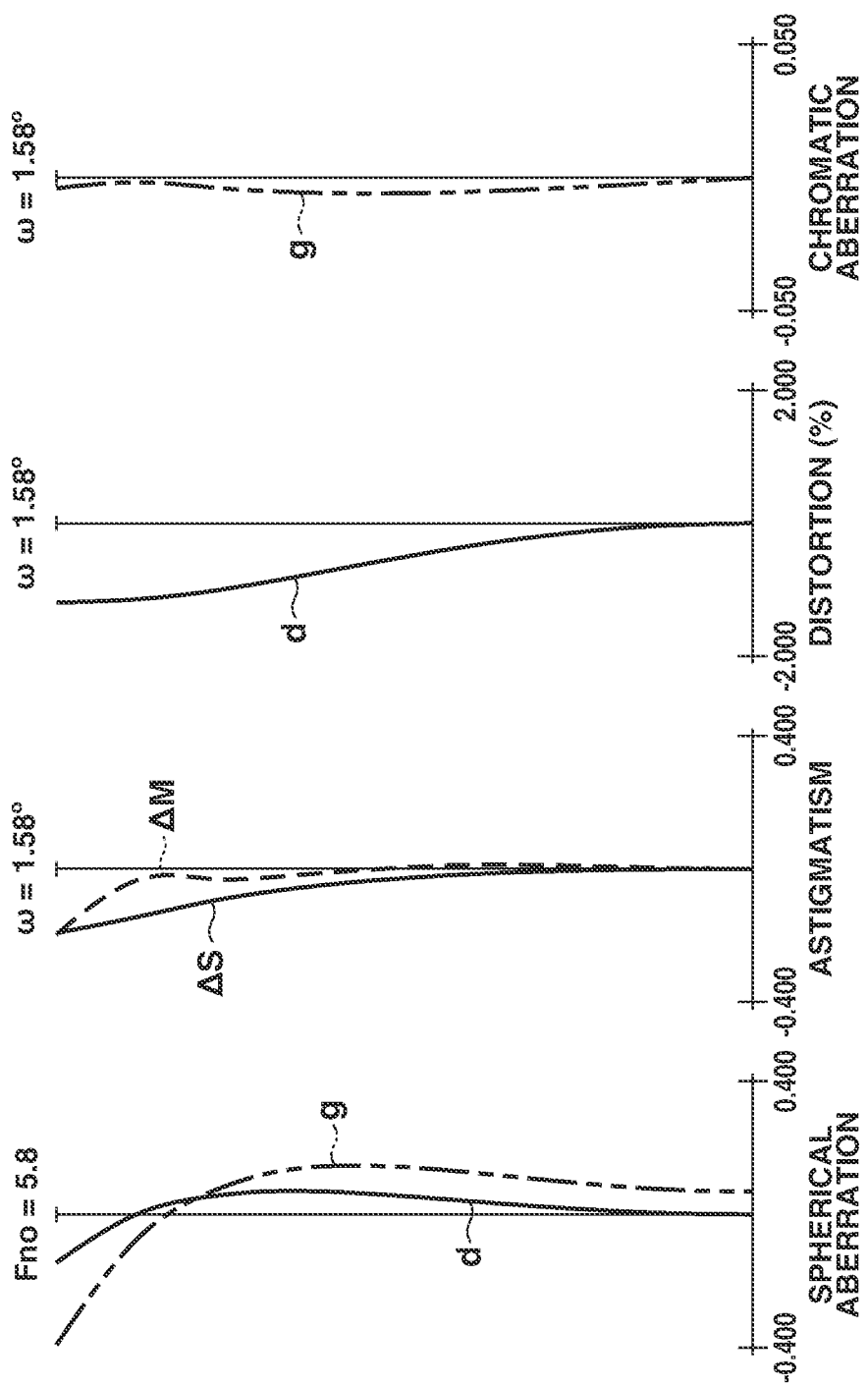
FIG. 12 illustrates an aberration diagram of when an infinitely-distant object is in focus in a case where the converter lens according to the fifth exemplary embodiment is disposed on an image side of the master lens.

FIG. 11 is a cross-sectional view illustrating the converter lens RCL according to the fifth exemplary embodiment. FIG. 12 is an aberration diagram of when an infinitely-distant object is in focus in a case where the converter lens RCL according to the fifth exemplary embodiment is disposed on the image side of the master lens ML.

In the converter lens RCL according to the fifth exemplary embodiment, the first lens element L1 is a positive lens Lp closest to the object in the converter lens RCL. The second lens element L2 is a cemented lens including three lenses: a negative, a positive, and a negative lens in this order. These lenses are disposed on a second, third, and fourth lens position from a lens closest to the object in the converter lens RCL.

Figure 13:
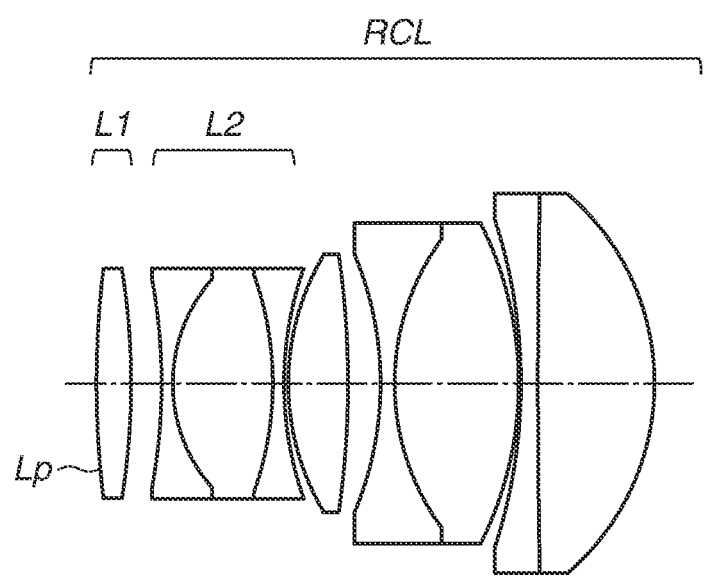
FIG. 13 illustrates a cross-sectional view illustrating a converter lens according to a sixth exemplary embodiment.
Figure 14:
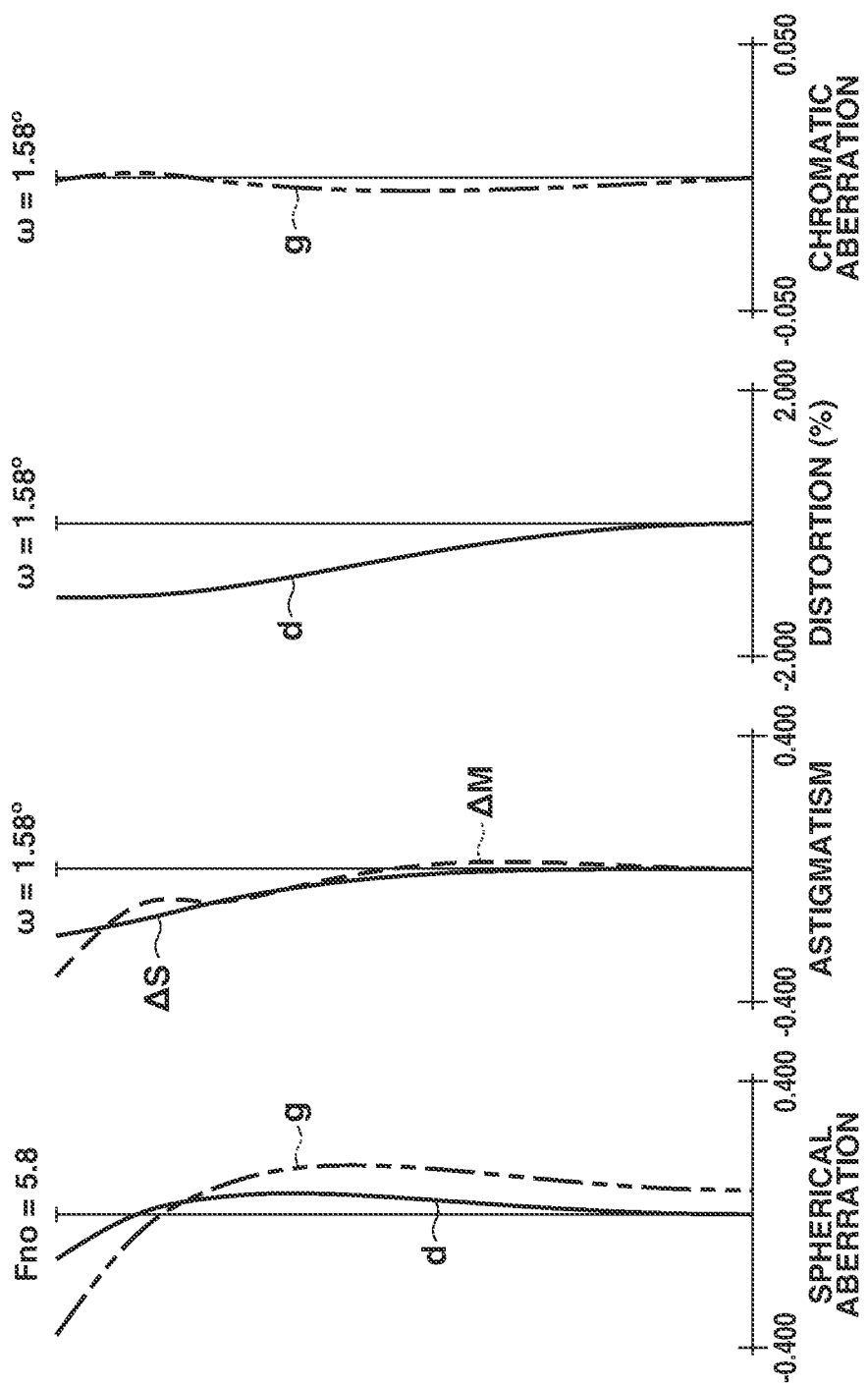
FIG. 14 illustrates an aberration diagram of when an infinitely-distant object is in focus in a case where the converter lens according to the sixth exemplary embodiment is disposed on an image side of the master lens.

FIG. 13 is a cross-sectional view illustrating the converter lens RCL according to the sixth exemplary embodiment. FIG. 14 is an aberration diagram of when an infinitely-distant object is in focus in a case where the converter lens RCL according to the sixth exemplary embodiment is disposed on the image side of the master lens ML.

In the converter lens RCL according to the sixth exemplary embodiment, the first lens element L1 is a positive lens Lp closest to the object in the converter lens RCL. The second lens element L2 is a cemented lens including three lenses: a negative, a positive, and a negative lens in this order. These lenses are disposed on a second, third, and fourth lens position from a lens closest to the object in the converter lens RCL.

In each of the first to sixth exemplary embodiments, the inequalities (1) to (11) are satisfied so that high optical performance is realized while the converter lens RCL is small in size.

A numerical exemplary embodiment of the master lens ML and first to sixth numerical exemplary embodiments respectively corresponding to the converter lenses RCL according to the first to the sixth exemplary embodiments will be described.

In each numerical exemplary embodiment, the surface number indicates the order of an optical surface from the object side. Further, r is the curvature radius (mm) of an optical surface, d at a surface number i is the interval (mm) between the ith optical surface and the (i+1)th optical surface, nd is a d-line refraction index of a material of an optical member, and vd is the Abbe number of the material of the optical member using the d-line as a reference. The definition of the Abbe number is $$vd=(Nd-1)/(NF-NC),$$

as described above.

BF is a back focus. The back focus of the master lens ML in the numerical exemplary embodiments is an air equivalent length of the distance from the surface closest to the image to the paraxial image plane on the optical axis.

A full lens length of the master lens ML in the numerical exemplary embodiments is the sum of the back focus and the distance on the optical axis from a surface closest to the object in the master lens ML (i.e., first lens surface) to a surface closest to the image in the master lens ML (i.e., last lens surface). A full lens length of the converter lens RCL in the numerical exemplary embodiments is the distance on the optical axis from a lens surface closest to the object in the converter lens RCL (i.e., first lens surface) to a lens surface closest to the image in the converter lens RCL (i.e., last lens surface).

A lens interval between the master lens ML and the converter lens RCL is a distance on the optical axis from a surface closest to the image in the master lens ML to a surface closest to the object in the converter lens RCL. The interval between the master lens ML and the converter lens RCL is specified by an air equivalent length.

A front principal point position is the distance from a surface closest to the object to a front principal point, and a rear principal point position is the distance from a surface closest to the image to a rear principal point. Each numerical value of the front principal point position and the rear principal point position is a paraxial amount, and the sign of the value is positive in the direction from the object side to the image side.

Table 1 shows physical quantities that are used in the above-described inequalities in the first to sixth numerical exemplary embodiments. Table 2 shows values corresponding to the inequalities.

In Table 2, SFa is a value of (ra2+ra1)/(ra2−ra1) described in the inequality (2).

[Master Lens]

Common to the Converter Lenses According to the First to Sixth Numerical Exemplary Embodiments Unit mm Surface Data

| Surface Number | r | d | nd | vd | θgF |
|---|---|---|---|---|---|
| 1 | 147.291 | 15.31 | 1.59522 | 67.74 | 0.5442 |
| 2 | 497.553 | 135.95 | | | |
| 3 | 93.917 | 15.46 | 1.43700 | 95.10 | 0.5326 |
| 4 | −169.659 | 1.50 | 1.80610 | 33.27 | 0.5881 |
| 5 | 85.058 | 2.78 | | | |
| 6 | 81.980 | 11.17 | 1.43700 | 95.10 | 0.5326 |
| 7 | ∞ | 30.12 | | | |
| 8 | 64.700 | 7.23 | 1.89286 | 20.36 | 0.6393 |
| 9 | 117.746 | 0.20 | | | |
| 10 | 53.244 | 2.00 | 1.83400 | 37.16 | 0.5776 |
| 11 | 34.348 | 8.98 | 1.43700 | 95.10 | 0.5326 |
| 12 | 71.295 | 7.95 | | | |
| 13 (Diaphragm) | ∞ | 5.00 | | | |
| 14 | −424.241 | 1.60 | 1.61800 | 63.40 | 0.5395 |
| 15 | 56.377 | 38.46 | | | |
| 16 | 192.506 | 1.40 | 1.89286 | 20.36 | 0.6393 |
| 17 | 120.766 | 4.96 | 1.51742 | 52.43 | 0.5564 |
| 18 | −71.885 | 1.00 | | | |
| 19 | 61.529 | 4.26 | 1.80610 | 33.27 | 0.5881 |
| 20 | −244.681 | 1.20 | 1.53775 | 74.70 | 0.5392 |
| 21 | 29.916 | 6.46 | | | |
| 22 | −88.814 | 1.20 | 1.72916 | 54.68 | 0.5444 |
| 23 | 62.251 | 2.54 | | | |
| 24 | 94.888 | 4.00 | 1.65412 | 39.68 | 0.5737 |
| 25 | −343.957 | 6.25 | | | |
| 26 | 45.503 | 9.29 | 1.64769 | 33.79 | 0.5938 |
| 27 | −81.900 | 1.70 | 1.80810 | 22.76 | 0.6307 |
| 28 | 81.305 | 6.55 | | | |
| 29 | 64.484 | 5.47 | 1.56732 | 42.82 | 0.5731 |
| 30 | 294.428 | 39.00 | | | |
| Image Plane | ∞ | | | | |

Various Types of Data

| | |
|---|---|
| Focal Length | 392.00 |
| F-Number | 2.90 |
| Half Angle of View (degrees) | 3.16 |
| Image Height | 21.64 |
| Full Lens Length | 379.01 |
| BF | 39.00 |

[Converter Lens]

First Numerical Exemplary Embodiment

Unit mm

Surface Data

| Surface Number | r | d | nd | vd |
|---|---|---|---|---|
| 1 | 800.000 | 3.97 | 1.85478 | 24.8 |
| 2 | −64.600 | 5.05 | | |
| 3 | −41.053 | 1.50 | 1.88300 | 40.8 |
| 4 | 109.415 | 7.84 | 1.53172 | 48.8 |
| 5 | −33.368 | 0.67 | | |
| 6 | −43.314 | 1.50 | 1.90043 | 37.4 |
| 7 | 176.343 | 10.11 | 1.51742 | 52.4 |
| 8 | −22.583 | 1.60 | 1.90043 | 37.4 |
| 9 | −125.408 | 2.17 | | |
| 10 | −84.365 | 7.82 | 1.63980 | 34.5 |
| 11 | −30.377 | | | |

Various Types of Data

| | |
|---|---|
| Focal Length | −152.43 |
| Full Lens Length | 42.24 |
| Front Principal Point Position | −10.55 |
| Rear Principal Point Position | −50.64 |
| Lateral Magnification | 1.400 |

An interval between the master lens and the converter lens according to the first numerical exemplary embodiment: 6.00

Second Numerical Exemplary Embodiment

Unit mm

Surface Data

| Surface Number | r | d | nd | vd |
|---|---|---|---|---|
| 1 | 364.337 | 1.50 | 1.90043 | 37.4 |
| 2 | 75.135 | 4.30 | 1.85478 | 24.8 |
| 3 | −108.452 | 3.59 | | |
| 4 | −81.339 | 1.50 | 1.90043 | 37.4 |
| 5 | 45.855 | 8.57 | 1.62004 | 36.3 |
| 6 | −31.329 | 3.00 | | |
| 7 | −24.851 | 1.50 | 2.05090 | 26.9 |
| 8 | −202.363 | 5.73 | | |
| 9 | −99.050 | 1.70 | 1.90043 | 37.4 |
| 10 | 252.137 | 11.91 | 1.67300 | 38.3 |
| 11 | −29.905 | | | |

Various Types of Data

| | |
|---|---|
| Focal Length | −379.68 |
| Full Lens Length | 43.29 |
| Front Principal Point Position | −75.48 |
| Rear Principal Point Position | −141.87 |
| Lateral Magnification | 1.400 |

An interval between the master lens and the converter lens according to the second numerical exemplary embodiment: 6.00

Third Numerical Exemplary Embodiment

Unit mm

Surface Data

| Surface Number | r | d | nd | vd |
|---|---|---|---|---|
| 1 | ∞ | 3.32 | 1.85478 | 24.8 |
| 2 | −58.256 | 3.22 | | |
| 3 | −56.595 | 1.30 | 1.77250 | 49.6 |
| 4 | 68.517 | 6.43 | 1.60342 | 38.0 |
| 5 | −42.322 | 1.30 | 2.00100 | 29.1 |
| 6 | −351.582 | 3.55 | | |
| 7 | −61.010 | 9.54 | 1.51742 | 52.4 |
| 8 | −20.182 | 1.65 | 1.95375 | 32.3 |
| 9 | −73.911 | 2.85 | | |
| 10 | −70.983 | 7.36 | 1.63980 | 34.5 |
| 11 | −28.545 | | | |

Various Types of Data

| | |
|---|---|
| Focal Length | −204.04 |
| Full Lens Length | 40.52 |
| Front Principal Point Position | −25.29 |
| Rear Principal Point Position | −69.31 |
| Lateral Magnification | 1.400 |

An interval between the master lens and the converter lens according to the third numerical exemplary embodiment: 6.00

Fourth Numerical Exemplary Embodiment

Unit mm

Surface Data

| Surface Number | r | d | nd | vd |
|---|---|---|---|---|
| 1 | 159.417 | 3.91 | 1.80518 | 25.5 |
| 2 | −68.675 | 3.95 | | |
| 3 | −50.952 | 1.20 | 1.90043 | 37.4 |
| 4 | 16.198 | 9.93 | 1.66565 | 35.6 |
| 5 | −32.188 | 1.20 | 1.83481 | 42.7 |
| 6 | 37.352 | 0.46 | | |
| 7 | 31.866 | 5.03 | 1.72047 | 34.7 |
| 8 | −260.827 | 5.20 | | |
| 9 | −75.715 | 1.50 | 1.91082 | 35.3 |
| 10 | 30.495 | 10.24 | 1.67300 | 38.3 |
| 11 | −41.863 | 1.60 | 2.05090 | 26.9 |
| 12 | −917.130 | 1.18 | | |
| 13 | 544.949 | 12.25 | 1.54814 | 45.8 |
| 14 | −26.693 | | | |

Various Types of Data

| | |
|---|---|
| Focal Length | −115.57 |
| Full Lens Length | 57.65 |
| Front Principal Point Position | −24.78 |
| Rear Principal Point Position | −102.30 |
| Lateral Magnification | 2.000 |

An interval between the master lens and the converter lens according to the fourth numerical exemplary embodiment: 6.00

Fifth Numerical Exemplary Embodiment

Unit mm

Surface Data

| Surface Number | r | d | nd | vd |
|---|---|---|---|---|
| 1 | 230.983 | 3.76 | 1.80518 | 25.5 |
| 2 | −61.821 | 4.05 | | |
| 3 | −47.109 | 1.20 | 1.90043 | 37.4 |
| 4 | 16.833 | 11.39 | 1.62004 | 36.3 |
| 5 | −28.332 | 1.20 | 1.81600 | 46.6 |
| 6 | 54.014 | 0.30 | | |
| 7 | 33.307 | 5.48 | 1.72047 | 34.7 |
| 8 | −288.920 | 5.02 | | |
| 9 | −100.495 | 1.50 | 1.88300 | 40.8 |
| 10 | 29.178 | 12.81 | 1.60342 | 38.0 |
| 11 | −42.699 | 0.00 | | |
| 12 | −42.699 | 1.80 | 1.89286 | 20.4 |
| 13 | 449.449 | 11.49 | 1.56732 | 42.8 |
| 14 | −27.219 | | | |

Various Types of Data

| | |
|---|---|
| Focal Length | −126.12 |
| Full Lens Length | 59.99 |
| Front Principal Point Position | −30.06 |
| Rear Principal Point Position | −113.01 |
| Lateral Magnification | 2.000 |

An interval between the master lens and the converter lens according to the fifth numerical exemplary embodiment: 6.00

Sixth Numerical Exemplary Embodiment

| | Unit mm | | | |
|---|---|---|---|---|
| | Surface Data | | | |
| Surface Number | r | d | nd | vd |
| 1 | 102.255 | 3.69 | 1.80518 | 25.5 |
| 2 | −76.294 | 3.24 | | |
| 3 | −61.063 | 1.20 | 1.90043 | 37.4 |
| 4 | 16.888 | 10.64 | 1.60342 | 38.0 |
| 5 | −34.524 | 1.20 | 1.81600 | 46.6 |
| 6 | 37.047 | 0.46 | | |
| 7 | 26.804 | 6.35 | 1.66565 | 35.6 |
| 8 | −95.813 | 3.46 | | |
| 9 | −35.439 | 1.50 | 1.90043 | 37.4 |
| 10 | 26.155 | 13.21 | 1.66565 | 35.6 |
| 11 | −37.965 | 0.25 | | |
| 12 | −56.043 | 1.80 | 1.92286 | 20.9 |
| 13 | 1008.919 | 12.42 | 1.51742 | 52.4 |
| 14 | −26.712 | | | |
| Focal Length | | | −133.43 | |
| Full Lens Length | | | 59.42 | |
| Front Principal Point Position | | | −33.72 | |
| Rear Principal Point Position | | | −120.50 | |
| Lateral Magnification | | | 2.000 | |

An interval between the master lens and the converter lens according to the sixth numerical exemplary embodiment: 6.00

TABLE 1

| Parameter | First Numerical Exemplary Embodiment | Second Numerical Exemplary Embodiment | Third Numerical Exemplary Embodiment | Fourth Numerical Exemplary Embodiment | Fifth Numerical Exemplary Embodiment | Sixth Numerical Exemplary Embodiment |
|---|---|---|---|---|---|---|
| f | −152.434 | −379.683 | −204.035 | −115.572 | −126.123 | −133.435 |
| ra1 | −64.600 | −108.452 | −58.256 | −68.675 | −61.821 | −76.294 |
| ra2 | −41.053 | −81.339 | −56.595 | −50.952 | −47.109 | −61.063 |
| na1 | 1.855 | 1.855 | 1.855 | 1.805 | 1.805 | 1.805 |
| na2 | 1.883 | 1.900 | 1.772 | 1.900 | 1.900 | 1.900 |
| fa | −227.500 | −596.036 | 1732.266 | −319.537 | −312.081 | −453.311 |
| f1 | 70.077 | 103.122 | 68.153 | 60.071 | 60.918 | 54.770 |
| f2 | −152.761 | 220.712 | −43.234 | −15.122 | −15.557 | −14.792 |
| r | −30.377 | −29.905 | −28.545 | −26.693 | −27.219 | −26.712 |

TABLE 2

| Inequality | First Numerical Exemplary Embodiment | Second Numerical Exemplary Embodiment | Third Numerical Exemplary Embodiment | Fourth Numerical Exemplary Embodiment | Fifth Numerical Exemplary Embodiment | Sixth Numerical Exemplary Embodiment |
|---|---|---|---|---|---|---|
| (1) $|fa/f|$ | 1.492 | 1.570 | 8.490 | 2.765 | 2.474 | 3.397 |
| (2) SFa | −4.487 | −7.000 | −69.146 | −6.750 | −7.404 | −9.018 |
| (3) nAP | 1.636 | 1.716 | 1.654 | 1.682 | 1.663 | 1.651 |
| (4) nAN | 1.895 | 1.938 | 1.909 | 1.924 | 1.873 | 1.885 |
| (5) $|f1/fa|$ | 0.308 | 0.173 | 0.039 | 0.188 | 0.195 | 0.121 |
| (6) $|f1/f|$ | 0.460 | 0.272 | 0.334 | 0.520 | 0.483 | 0.410 |
| (7) vAN | 38.513 | 34.763 | 37.017 | 35.575 | 36.288 | 35.560 |
| (8) r1/f | 0.199 | 0.079 | 0.140 | 0.231 | 0.216 | 0.200 |
| (9) nd1 | 1.855 | 1.855 | 1.855 | 1.805 | 1.805 | 1.805 |
| (10) f2/f | 1.002 | −0.581 | 0.212 | 0.131 | 0.123 | 0.111 |
| (11) ra2/r1 | 1.351 | 2.720 | 1.983 | 1.909 | 1.731 | 2.286 |

[Image Capturing Apparatus According to Exemplary Embodiment]

Figure 15A:
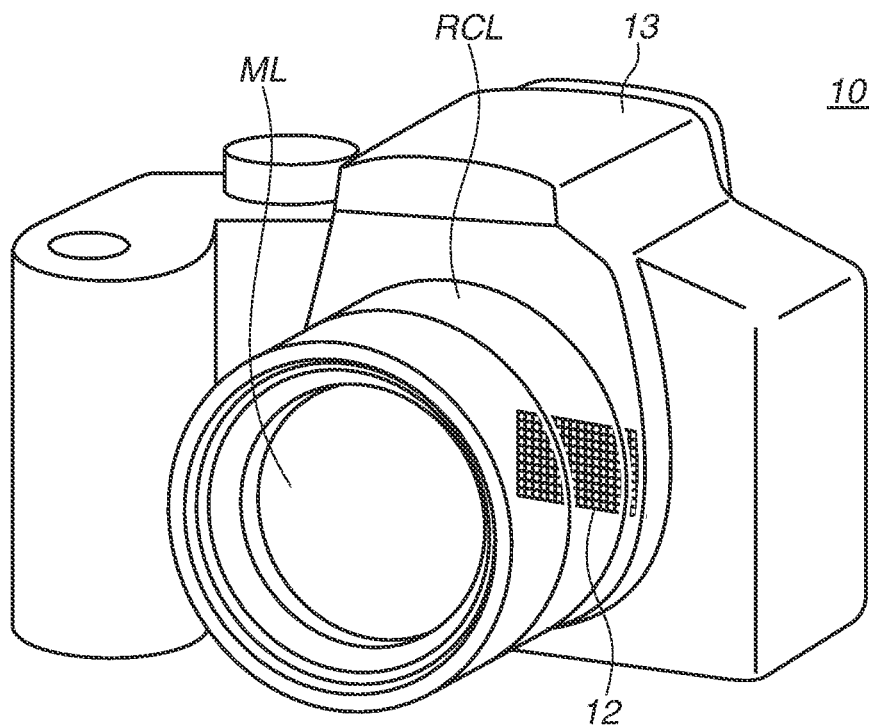
FIGS. 15A and 15B illustrate a configuration of an image capturing system.
Figure 15B:
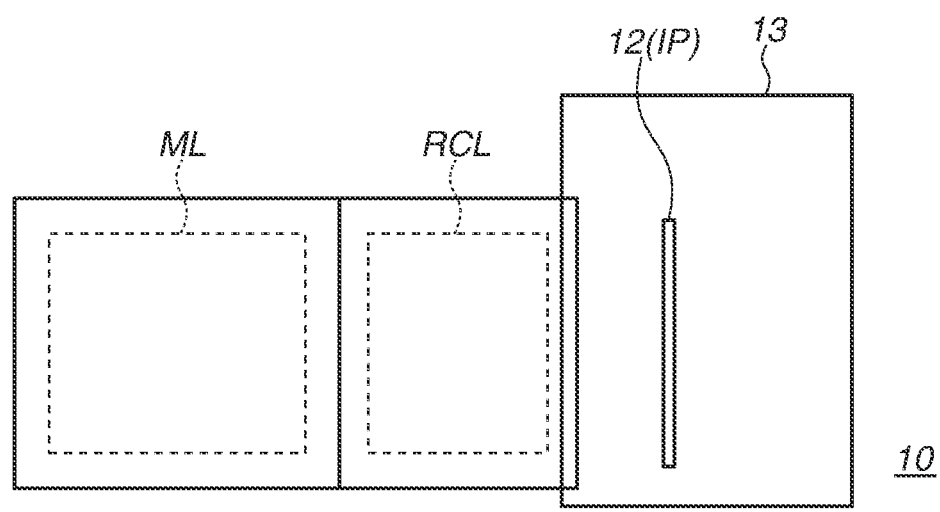

FIGS. 15A and 15B illustrate a configuration of an image capturing apparatus (e.g., digital camera) 10. FIG. 15A is a perspective view, and FIG. 15B is a side view. The image capturing apparatus 10 includes a camera main body 13, the master lens ML, the converter lens RCL according to any one of the above-described first to the sixth exemplary embodiments, and a light receiving element (e.g., image sensor) 12 configured to photoelectrically convert an image formed by the master lens ML and the converter lens RCL. An image sensor, such as a CCD sensor and a CMOS sensor, can be used as the light receiving element 12. The master lens ML and the converter lens RCL can be integrated with the camera main body 13, or each can be arranged to be attachable to and detachable from the camera main body 13. In the case where the master lens ML and the converter lens RCL are integrated with the camera main body 13, the converter lens RCL may be insertably and removably arranged on an optical axis.

[Interchangeable Lens According to Exemplary Embodiment]

The aspect of the embodiments is applicable to an interchangeable lens that includes the master lens ML and the converter lens RCL in the same barrel and is attachable to and detachable from an image capturing apparatus. The master lens ML can be a fixed focal length lens or a zoom lens. In this case, the converter lens RCL is insertably and removably arranged on an optical axis. The converter lens RCL is disposed on or off the optical axis based on a user instruction via an operation member or a user interface.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A converter lens having negative refractive power and disposed on an image side of a master lens so that a focal length of an entire system becomes greater than a focal length of the master lens alone, the converter lens comprising:
a first lens element closest to an object in the converter lens; and
a second lens element next to an image side of the first lens element with a space between the first lens element and the second lens element,
wherein a total number of positive lenses included in the converter lens is four or more, and a total number of negative lens included in the converter lens is three or more, and
wherein the following inequalities are satisfied:

$$1.45 < |fa/f| < 8.55;$$

$$-80.0 < (ra2+ra1)/(ra2-ra1) < -2.00; \text{ and}$$

$$0.15 < |f1/f| \le 0.520,$$

where f is a focal length of the converter lens, na1 is a d-line refractive index of a material of an image-side lens of the first lens element, na2 is a d-line refractive index of a material of an object-side lens of the second lens element, ra1 is a curvature radius of the image-side lens surface of the first lens element, ra2 is a curvature radius of the object-side lens surface of the second lens element, fa is a focal length of the space between the first lens element and the second lens element and is defined as fa=1/[{(1/ra1)×(1−na1)/na2}−{(1/ra2)×(1−na2)/na2}], and f1 is a focal length of the first lens element.

2. The converter lens according to claim 1,
wherein the converter lens includes at least one positive lens, and
wherein the following inequality is satisfied:

$$1.58 < nAP < 1.80$$

where nAP is an average d-line refractive index of a material of every positive lens included in the converter lens.

3. The converter lens according to claim 2, wherein every lens of the converter lens is a spherical lens.

4. The converter lens according to claim 1,
wherein the converter lens includes at least one negative lens, and
wherein the following inequality is satisfied:

$$1.80 < nAN < 2.20$$

where nAN is an average d-line refractive index of a material of every negative lens included in the converter lens.

5. The converter lens according to claim 4, wherein every lens of the converter lens is a spherical lens.

6. The converter lens according to claim 1,
wherein the following inequality is satisfied:

$$0.01 < |f1/fa| < 0.40$$

where f1 is a focal length of the first lens element.

7. The converter lens according to claim 6, wherein every lens of the converter lens is a spherical lens.

8. The converter lens according to claim 1,
wherein the following inequality is satisfied:

$$30.0 < vAN < 39.0,$$

where vAN is an average Abbe number of a material of every negative lens included in the converter lens.

9. The converter lens according to claim 8, wherein every lens of the converter lens is a spherical lens.

10. The converter lens according to claim 1,
wherein a lens surface closest to an image in the converter lens is convex with respect to the image, and
wherein the following inequality is satisfied:

$$0.02 < rl/f < 0.32$$

where rl is a curvature radius of the lens surface.

11. The converter lens according to claim 1,
wherein the converter lens includes at least one positive lens, and
wherein the following inequality is satisfied:

$$1.75 < nd1 < 2.00$$

where nd1 is a d-line refractive index of the positive lens closest to the object among the positive lens included in the converter lens.

12. The converter lens according to claim 1,
wherein the first lens element has positive refractive power, and the second lens element has negative refractive power, and
wherein the following inequality is satisfied:

$$0.04 < f2/f < 1.10$$

where f2 is a focal length of the second lens element.

13. The converter lens according to claim 1, wherein the following inequality is satisfied:

$$1.00 < ra2/rl < 3.40$$

where rl is a curvature radius of an image-side lens surface of a lens closest to an image in the converter lens.

14. The converter lens according to claim 1, wherein the second lens element includes a cemented lens including a negative lens, a positive lens, and a negative lens in this order from an object side to an image side.

15. The converter lens according to claim 1, wherein the object-side lens surface of the second lens element is concave with respect to the object.

16. The converter lens according to claim 1, wherein an image-side lens surface of the second lens element is concave with respect to an image.

17. The converter lens according to claim 1, wherein a lens element closest to an image in the converter lens has positive refractive power.

18. The converter lens according to claim 1, wherein every lens of the converter lens is a spherical lens.

19. An interchangeable lens comprising a master lens and a converter lens having negative refractive power and configured to be inserted to or removed from an optical path of the master lens so that a focal length of an entire system becomes greater than a focal length of the master lens alone, the converter lens comprising:
a first lens element closest to an object in the converter lens; and
a second lens element next to an image side of the first lens element with a space between the first lens element and the second lens element, wherein a total number of positive lenses included in the converter lens is four or more, and a total number of negative lens included in the converter lens is three or more, and wherein the following inequalities are satisfied:

$1.45 < |fa/f| < 8.55;$ $-80.0 < (ra2+ra1)/(ra2-ra1) < -2.00;$ and $0.15 < |f1/f| \leq 0.520,$ where f is a focal length of the converter lens, na1 is a d-line refractive index of a material of an image-side lens of the first lens element, na2 is a d-line refractive index of a material of an object-side lens of the second lens element, ra1 is a curvature radius of the image-side lens surface of the first lens element, ra2 is a curvature radius of the object-side lens surface of the second lens element, fa is a focal length of the space between the first lens element and the second lens element and is defined as $fa=1/[\{(1/ra1) \times (1-na1)/na2\} - \{(1/ra2) \times (1-na2)/na2\}]$, and f1 is a focal length of the first lens element.

20. An image capturing apparatus comprising:
a master lens;
a converter lens having negative refractive power and disposed on an optical path of the master lens so that a focal length of an entire system becomes greater than a focal length of the master lens alone; and
an image sensor,
the converter lens comprising:
a first lens element closest to an object in the converter lens; and
a second lens element next to an image side of the first lens element with a space between the first lens element and the second lens element,
wherein a total number of positive lenses included in the converter lens is four or more, and a total number of negative lens included in the converter lens is three or more, and
wherein the following inequalities are satisfied:

$1.45 < |fa/f| < 8.55;$ $-80.0 < (ra2+ra1)/(ra2-ra1) < -2.00;$ and $0.15 < |f1/f| \leq 0.520,$ where f is a focal length of the converter lens, na1 is a d-line refractive index of a material of an image-side lens of the first lens element, na2 is a d-line refractive index of a material of an object-side lens of the second lens element, ra1 is a curvature radius of the image-side lens surface of the first lens element, ra2 is a curvature radius of the object-side lens surface of the second lens element, fa is a focal length of the space between the first lens element and the second lens element and is defined as $fa=1/[\{(1/ra1) \times (1-na1)/na2\} - \{(1/ra2) \times (1-na2)/na2\}]$, and f1 is a focal length of the first lens element.

21. A converter lens having negative refractive power and disposed on an image side of a master lens so that a focal length of an entire system becomes greater than a focal length of the master lens alone, the converter lens comprising:
a first lens element closest to an object in the converter lens; and
a second lens element next to an image side of the first lens element with a space between the first lens element and the second lens element,
wherein a total number of positive lenses included in the converter lens is four or more, and a total number of negative lens included in the converter lens is three or more, and
wherein the following inequalities are satisfied:

$1.45 < |fa/f| < 8.55;$ $-80.0 < (ra2+ra1)/(ra2-ra1) < -2.00;$ $0.01 < |f1/fa| \leq 0.195;$ and $0.02 < r1/f < 0.32$ where f is a focal length of the converter lens, na1 is a d-line refractive index of a material of an image-side lens of the first lens element, na2 is a d-line refractive index of a material of an object-side lens of the second lens element, ra1 is a curvature radius of the image-side lens surface of the first lens element, ra2 is a curvature radius of the object-side lens surface of the second lens element, fa is a focal length of the space between the first lens element and the second lens element and is defined as $fa=1/[\{(1/ra1) \times (1-na1)/na2\} - \{(1/ra2) \times (1-na2)/na2\}]$, f1 is a focal length of the first lens element, and r1 is a curvature radius of an image-side lens surface of a lens closest to an image in the converter lens.

22. A converter lens having negative refractive power and disposed on an image side of a master lens so that a focal length of an entire system becomes greater than a focal length of the master lens alone, the converter lens comprising:
a first lens element closest to an object in the converter lens; and
a second lens element next to an image side of the first lens element with a space between the first lens element and the second lens element,
wherein a total number of positive lenses included in the converter lens is four or more, and a total number of negative lens included in the converter lens is three or more,
wherein the second lens element includes a cemented lens including a negative lens, a positive lens, and a negative lens in this order from an object side to an image side, and
wherein the following inequalities are satisfied:

$1.45 < |fa/f| < 8.55;$ $-80.0 < (ra2+ra1)/(ra2-ra1) < -2.00;$ $0.01 < |f1/fa| \leq 0.195;$ and where f is a focal length of the converter lens, na1 is a d-line refractive index of a material of an image-side lens of the first lens element, na2 is a d-line refractive index of a material of an object-side lens of the second lens element, ra1 is a curvature radius of the image-side lens surface of the first lens element, ra2 is a curvature radius of the object-side lens surface of the second lens element, fa is a focal length of the space between the first lens element and the second lens element and is defined as $fa=1/[\{(1/ra1) \times (1-na1)/na2\} - \{(1/ra2) \times (1-na2)/na2\}]$, and f1 is a focal length of the first lens element.

23. The converter lens according to claim 22, wherein the following inequality is satisfied:

$$0.02 < rl/f < 0.32$$

where rl is a curvature radius of an image-side lens surface of a lens closest to an image in the converter lens.

* * * * *